US008878463B2

(12) United States Patent
Wu

(10) Patent No.: US 8,878,463 B2
(45) Date of Patent: Nov. 4, 2014

(54) LED LAMP CONTROL CIRCUIT

(75) Inventor: Chun-wei Wu, Guangzhou (CN)

(73) Assignee: Nanker (Guang Zhou) Semiconductor Manufacturing Corp., Guangzhou (CN)

( * ) Notice: Subject to any disclaimer, the term of this patent is extended or adjusted under 35 U.S.C. 154(b) by 0 days.

(21) Appl. No.: 14/233,697

(22) PCT Filed: May 8, 2012

(86) PCT No.: PCT/CN2012/075210
§ 371 (c)(1),
(2), (4) Date: Mar. 4, 2014

(87) PCT Pub. No.: WO2012/155801
PCT Pub. Date: Nov. 22, 2012

(65) Prior Publication Data
US 2014/0191659 A1      Jul. 10, 2014

(30) Foreign Application Priority Data

May 17, 2011  (CN) .......................... 2011 1 0129786
Sep. 14, 2011  (CN) .......................... 2011 1 0270659

(51) Int. Cl.
*H05B 33/02*   (2006.01)
*H05B 33/08*   (2006.01)

(52) U.S. Cl.
CPC ................................. *H05B 33/0884* (2013.01)
USPC ............ 315/309; 315/118; 315/183; 315/224

(58) Field of Classification Search
CPC ..... F21V 29/00; F21V 29/002; F21V 29/004; F21V 29/02; F21V 29/025; F21V 29/027; F21V 29/20; F21V 29/22; F21V 29/2206; F21V 29/26; F21V 29/262; H05B 37/00; H05B 37/02; H05B 37/03; H05B 37/036; H05B 33/00; H05B 33/02; H05B 33/08; H05B 33/0803; H05B 33/0806; H05B 33/0809; H05B 33/0815; H05B 33/0884

USPC ........... 315/50, 246, 247, 307, 308, 309, 224, 315/185 R, 193, 119, 125, 51, 112, 117, 315/118, 113, 32, 219

See application file for complete search history.

(56) References Cited

U.S. PATENT DOCUMENTS 8,310,171 B2 *  11/2012  Reisenauer et al. .......... 315/287
8,547,037 B2 *  10/2013  Yatsuda et al. ................ 315/309

FOREIGN PATENT DOCUMENTS

| CN | 101730340 A | 6/2010 |
| CN | 201628116 U | 11/2010 |
| CN | 201700047 U | 1/2011 |
| CN | 102307411 A | 1/2012 |
| CN | 102387638 A | 3/2012 |
| JP | 2000262049 A | 9/2000 |

OTHER PUBLICATIONS

International Search Report mailed Aug. 2, 2012 for the corresponding PCT Application No. PCT/CN2012/075210.

* cited by examiner

*Primary Examiner* — David H Vu
(74) *Attorney, Agent, or Firm* — Leason Ellis LLP

(57) ABSTRACT

An LED lamp control circuit comprises a rectifier circuit, an LED light source load, a constant current circuit, and a first temperature detect switch circuit. The LED light source load comprises at least one group of LEDs. The constant current circuit comprises at least one group of constant current source components, each of which is connected to at least one group of LEDs in the LED light source load and comprises a depletion mode field effect transistor. The first temperature detect switch circuit is connected to an input end of a power source, and comprises a first normally closed temperature detect switch mounted on a radiator. When the temperature of the radiator exceeds the disconnection temperature of the first normally closed temperature detect switch, the first normally closed temperature detect switch is disconnected, so as to cut off the power supply of the LED light source load.

12 Claims, 14 Drawing Sheets

US 8,878,463 B2

LED LAMP CONTROL CIRCUIT

CROSS-REFERENCE TO RELATED PATENT APPLICATIONS

This application is a U.S. National Phase Application under 35 U.S.C. §371 of International Patent Application No. PCT/CN2012/075210, filed May 8, 2012, and claims the benefit of Chinese Patent Applications No. 201110129786.3, filed on May 17, 2011 and No. 201110270659.5, filed Sep. 14, 2011, all of which are incorporated by reference in their entirety herein. The International Application was published on Nov. 22, 2012 as International Publication No. WO/2012/155801 under PCT Article 21(2).

FIELD OF THE INVENTION

The present invention relates to an LED lamp control circuit.

BACKGROUND OF THE INVENTION

At present, LEDs are applied more and more widely, and LED lamps for daily indoor and outdoor lighting are more and more popular. The present LED lighting is increasingly developed towards the high power direction, and the high heat brought by high-power LEDs is an important factor puzzling the popularization of the LEDs. If an LED works at a high temperature for a long term, the service life of the LED could be greatly shortened, the exertion of advantages of the LED could be affected, and even a dead lamp phenomenon could be caused eventually leading to rejection of the lamp. If the lamp can be automatically turned off at overheat, the aforementioned adverse consequences can be avoided. But in some cases, even if the temperature is high, lighting is still needed, and at this moment, if the lamps are turned off, the lighting function cannot be realized, and the service requirement cannot be met.

In addition, in an environment where a plurality of LED lamps are simultaneously used, if the plurality of LED lamps are simultaneously turned on, a switching surge shock is produced, and the voltage instantaneously fluctuates within a large range. Once the instantaneous voltage is overly high, key components in the circuit may be shocked. Once the instantaneous voltage exceeds the bearing capacity of the components, the key components are damaged to cause death and rejection of the LED lamps.

SUMMARY OF THE INVENTION

The present invention intends to overcome deficiencies of the prior art and provide an LED lamp control circuit, which is simple in structure and reliable in control and has a high-temperature protection function.

Further, the present invention also provides an LED lamp control circuit with a key component overvoltage protection function.

The first set of technical solutions adopted in the present invention is: the LED lamp comprises a heat sink for cooling an LED light source, and the circuit controlling the LED lamp comprises a rectifier circuit for changing an alternating current into a direct current, an LED light source load, a constant current circuit for regulating voltage and current for the LED light source load, and a first temperature control switch circuit, wherein the LED light source load comprises at least one group of plural LEDs connected in series, the constant current circuit comprises at least one group of constant current source devices with each group being connected in series to at least one group of the LEDs in the LED light source load and comprising at least one depletion mode field effect transistor, a drain of the depletion mode field effect transistor serves as a contact and a source of the depletion mode field effect transistor is short circuited with a grid to serve as the other contact, the first temperature control switch circuit is connected to an input of a power supply and comprises a first normally closed temperature control switch, and the first normally closed temperature control switch is mounted on the heat sink or at a specific position in the lamp and is disconnected when the temperature of the heat sink or the temperature at the specific position in the lamp exceeds the disconnection temperature of the first normally closed temperature control switch, which is a specific temperature between 60 and 100° C., to cut off the power supply of the LED light source load.

Each group of the constant current source devices is connected in parallel to a first Zener diode with an operating point being a specific voltage between 20 and 80V DC.

The circuit controlling the LED lamp further comprises a filter circuit connected behind the rectifier circuit.

The circuit controlling the LED lamp further comprises an overcurrent protection circuit that is connected to the input of the power supply and comprises an overcurrent protection fuse, and further comprises a power lightning protection circuit connected behind the overcurrent protection circuit and the first temperature control switch circuit.

The circuit controlling the LED lamp further comprises a power supply EMC circuit connected before the rectifier circuit that adopts bridge rectification.

The circuit controlling the LED lamp further comprises a light source EMC circuit connected before the LED light source load.

The circuit controlling the LED lamp further comprises a voltage regulation and PFC circuit connected behind the rectifier circuit but before the LED light source load.

The circuit controlling the LED lamp further comprises a cooling fan motor, and a fan protection circuit connected in parallel to the cooling fan motor, which comprises at least one fan shunt resistor and a second Zener diode connected in parallel to the fan shunt resistor with an operating point being a specific voltage between 5 and 24V DC.

The LED lamp further comprises a power board for supplying power to the LED light source, the circuit controlling the LED lamp further comprises a second temperature control switch circuit comprising a second normally closed temperature control switch and a voltage dividing resistor connected in parallel to the second normally closed temperature control switch, and the second normally closed temperature control switch is mounted on the power board and is disconnected when the circuit ambient temperature exceeds the disconnection temperature of the second normally closed temperature control switch, which is a specific temperature between 30 and 100° C., so that the current passes through the voltage dividing resistor to reduce the power supply current of the LED light source load.

The second temperature control switch circuit is connected in series to the LED light source load.

Alternatively, the circuit controlling the LED lamp comprises the voltage regulation and PFC circuit connected behind the rectifier circuit but before the LED light source load, the second temperature control switch circuit is connected to a sampling voltage end of a voltage output of the voltage regulation and PFC circuit, and the second normally closed temperature control switch is disconnected when the circuit ambient temperature exceeds the disconnection temperature of the second normally closed temperature control switch, so that the current passes through the voltage dividing resistor to reduce the output voltage of the voltage output of the voltage regulation and PFC circuit and the input voltage of a voltage input of the LED light source load.

The second set of technical solutions adopted in the present invention is: the LED lamp comprises a heat sink for cooling an LED light source, the circuit controlling the LED lamp comprises a rectifier circuit for changing an alternating current into a direct current, an LED light source load, a constant current circuit for regulating voltage and current for the LED light source load, and a first temperature control switch circuit, wherein the LED light source load comprises at least one group of plural LEDs connected in series; the constant current circuit comprises at least one group of constant current source devices with each group being connected in series to at least one group of the LEDs in the LED light source load and comprising at least one depletion mode field effect transistor, of which a drain serves as a contact and a source is short circuited with a grid to serve as the other contact; the first temperature control switch circuit is connected to an input of a power supply and comprises a first normally closed temperature control switch; and the first normally closed temperature control switch is mounted on the heat sink or at a specific position in the lamp, and is disconnected when the temperature of the heat sink or the temperature at the specific position in the lamp exceeds the disconnection temperature of the first normally closed temperature control switch, which is a specific temperature between 60 and 100° C., to cut off the power supply of the LED light source load.

Each group of the constant current source devices is connected in parallel to a first Zener diode with an operating point being a specific voltage between 20 and 80V DC.

The circuit controlling the LED lamp further comprises a filter circuit connected behind the rectifier circuit.

The circuit controlling the LED lamp further comprises an overcurrent protection circuit that is connected to the input of the power supply and comprises an overcurrent protection fuse, and further comprises a power lightning protection circuit connected behind the overcurrent protection circuit and the first temperature control switch circuit.

The circuit controlling the LED lamp further comprises a power supply EMC circuit connected before the rectifier circuit that adopts bridge rectification.

The circuit controlling the LED lamp further comprises a light source EMC circuit connected before the LED light source load.

The circuit controlling the LED lamp further comprises a voltage regulation and PFC circuit connected behind the rectifier circuit but before the LED light source load.

The circuit controlling the LED lamp further comprises a cooling fan motor, a fan protection circuit, and a third temperature control switch circuit connected in series to the lamp fan motor and then connected in parallel to the fan protection circuit. The fan protection circuit comprises at least one fan shunt resistor and a second Zener diode connected in parallel to the fan shunt resistor, the operating point of the second Zener diode is a specific voltage between 6 and 24V DC, and the third temperature control switch circuit comprises a normally open temperature control switch that is closed when the temperature exceeds the close temperature of the normally open temperature control switch, which is a specific temperature between 30 and 50° C., to supply power to the lamp fan motor.

The present invention has advantageous effects as below. The circuit controlling the LED lamp comprises a rectifier circuit for changing an alternating current into a direct current, a LED light source load, a constant current circuit for regulating voltage and current for the LED light source load, and a first temperature control switch circuit, wherein the LED light source load comprises at least one group of plural LEDs connected in series; the constant current circuit comprises at least one group of constant current source devices with each group being connected in series to at least one group of the LEDs in the LED light source load and comprising at least one depletion mode field effect transistor, of which a drain serves as the contact and a source is short circuited with a grid to serve as the other contact; the first temperature control switch circuit is connected to the input of the power supply, and comprises a first normally closed temperature control switch; and the first normally closed temperature control switch is mounted on the heat sink or at the specific position in the lamp, and is disconnected when the temperature of the heat sink or the temperature at the specific position in the lamp exceeds the disconnection temperature of the first normally closed temperature control switch, which is a specific temperature between 60 and 100° C., to cut off the power supply of the LED light source load. On account of the above, the constant current source devices, as independent devices, conveniently replace peripheral voltage regulation and current regulation circuits of other circuits in the prior art, so that circuit components are greatly reduced, and the circuit is simple and low in cost. By means of providing the first temperature control switch circuit connected to the input of the power supply in a way that the normally closed temperature control switch is disconnected when the temperature of the heat sink or the temperature at the certain specific position in the lamp exceeds the disconnection temperature of the normally closed temperature control switch to cut off the power supply of the LED light source load, and is reclosed when the temperature of the heat sink is lower than the disconnection temperature of the normally closed temperature control switch to lighten the LEDs for lighting, short service lives and rejection of the LEDs due to overheat are avoided, the service lives of the LEDs are prolonged, and the LEDs are protected from being damaged by high temperature. Thus, the present invention is simple in structure and reliable in control, and has a high-temperature protection function.

Since each group of the constant current source devices is connected in parallel to the first Zener diode with the operating point being the specific voltage between 20 and 80V DC, provision of the first Zener diode that controls the voltage of the constant current source devices within a certain range avoids overly high instantaneous voltage caused by switching surge shock produced when a plurality of lamps are simultaneously turned on, reduces shock to the constant current source, prevents the constant current source devices from being damaged, and ensures stable operation of the whole circuit, so the present invention is simple in structure and reliable in control and has a key component overvoltage protection function.

The circuit controlling the LED lamp further comprises a second temperature control switch circuit comprising a second normally closed temperature control switch and a voltage dividing resistor connected in parallel to the second normally closed temperature control switch, and the second normally closed temperature control switch is mounted on the power board and is disconnected when the circuit ambient temperature exceeds the disconnection temperature of the second normally closed temperature control switch, which is a specific temperature between 30 and 100° C., so that the current passes through the voltage dividing resistor to reduce the power supply current of the LED light source load. On account of the above, when the working ambient temperature reaches the disconnection temperature of the second normally closed temperature control switch, the current passes through the voltage dividing resistor to reduce the power supply current of the LED light source load, so that the power of the LED light source is reduced, heat is reduced, and the lamp can still be kept in a lighting state at an extreme ambient temperature to meet the service requirement. The above solution keeps operating in a low-power state even at a rather high temperature to meet the service requirement, so the present invention can still light at a higher temperature.

Since the circuit controlling the LED lamp further comprises a cooling fan motor and a fan protection circuit connected in parallel to the cooling fan motor, which comprises at least one fan shunt resistor and a second Zener diode connected in parallel to the fan shunt resistor with an operating point being a specific voltage between 5 and 24V DC, provision of the second Zener diode that controls the voltage of the cooling fan motor within a certain range avoids overly high instantaneous voltage caused by switching surge shock produced when a plurality of lamps are simultaneously turned on, reduces shock to the cooling fan motor, prevents the cooling fan motor from being damaged, and ensures stable operation of heat dissipation of the whole circuit, so the present invention also has a fan overvoltage protection function;

The circuit controlling the LED lamp further comprises a third temperature control switch circuit connected in series to the lamp fan motor and then connected in parallel to the fan protection circuit, and the third temperature control switch circuit comprises a normally open temperature control switch that is closed when the temperature exceeds the close temperature of the normally open temperature control switch, which is a specific temperature between 30 and 50° C., to supply power to the lamp fan motor. On account of the above, the normally open temperature control switch is closed when the temperature exceeds the close temperature of the normally open temperature control switch to supply the power to the lamp fan motor so that the fan works and actively dissipates heat, and is disconnected when the temperature is lower than the close temperature of the normally open temperature control switch so that the lamp fan motor does not work to avoid waste and noise and further avoid disadvantages caused by forcibly starting an icing fan in special low-temperature occasions, so the present invention has a low-temperature protection function.

BRIEF DESCRIPTION OF DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Embodiment I

Figure 1:
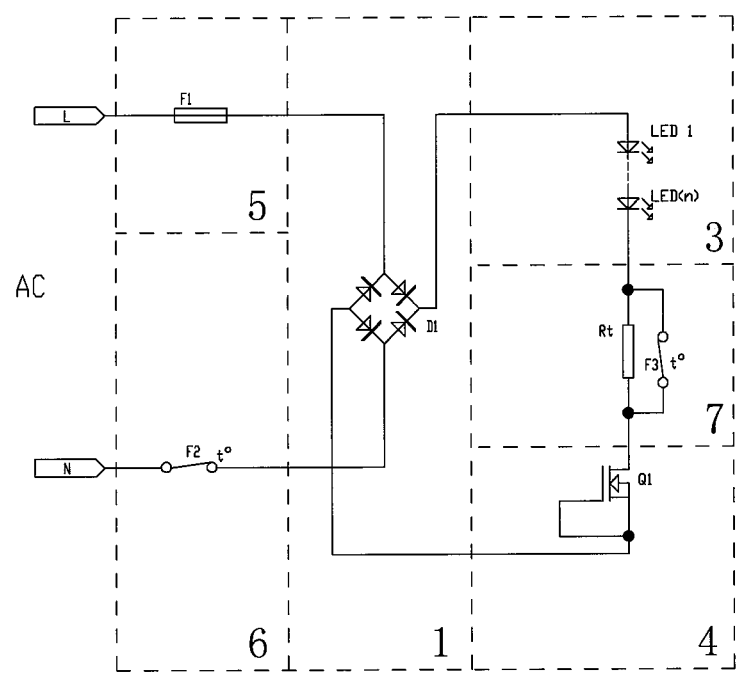
FIG. 1 is a structure diagram of the LED lamp control circuit as Embodiment I of the present invention.
Figure 2:
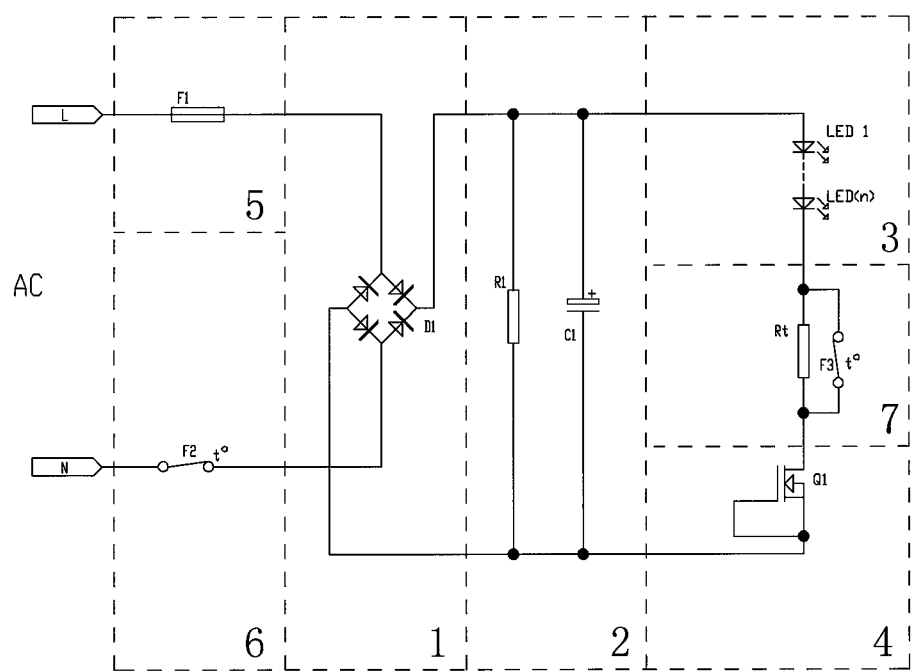
FIG. 2 is a structure diagram of the LED lamp control circuit as Embodiment II of the present invention.
Figure 3:
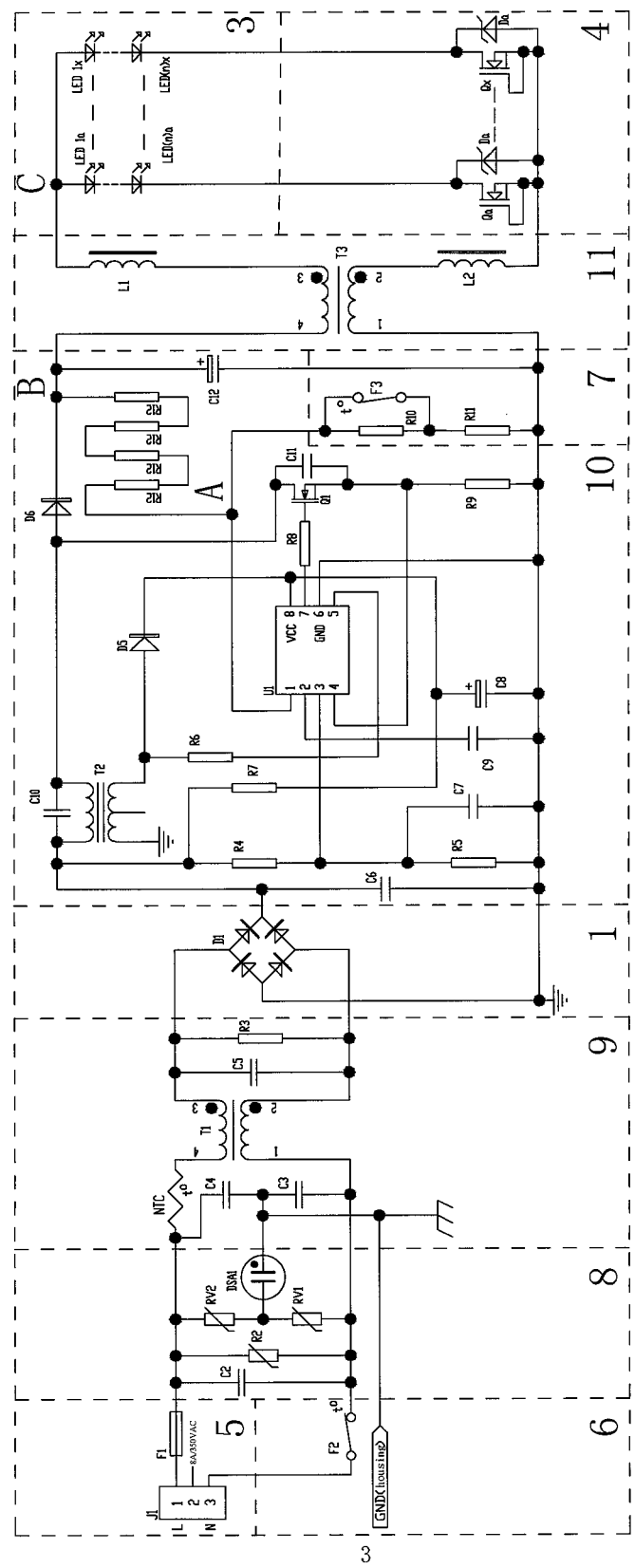
FIG. 3 is a structure diagram of the LED lamp control circuit as Embodiment III of the present invention.
Figure 4:
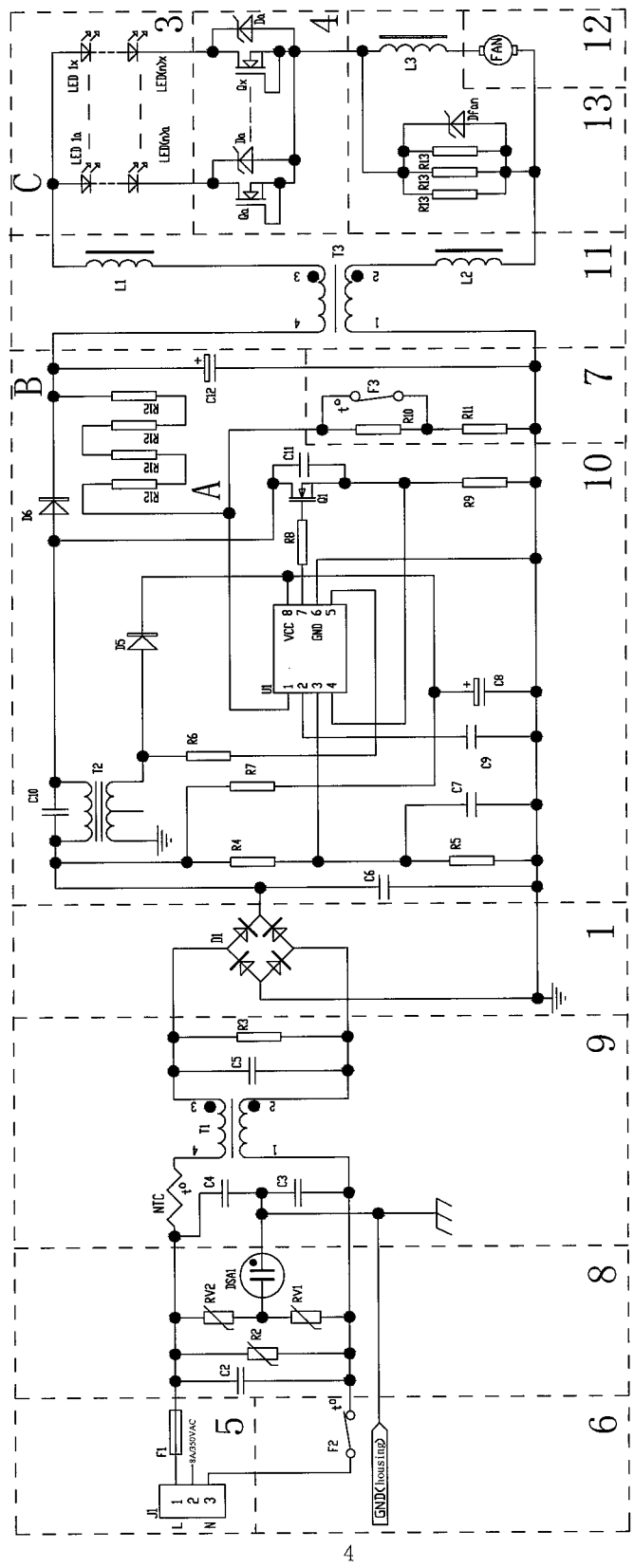
FIG. 4 is a structure diagram of the LED lamp control circuit as Embodiment IV of the present invention.
Figure 5:
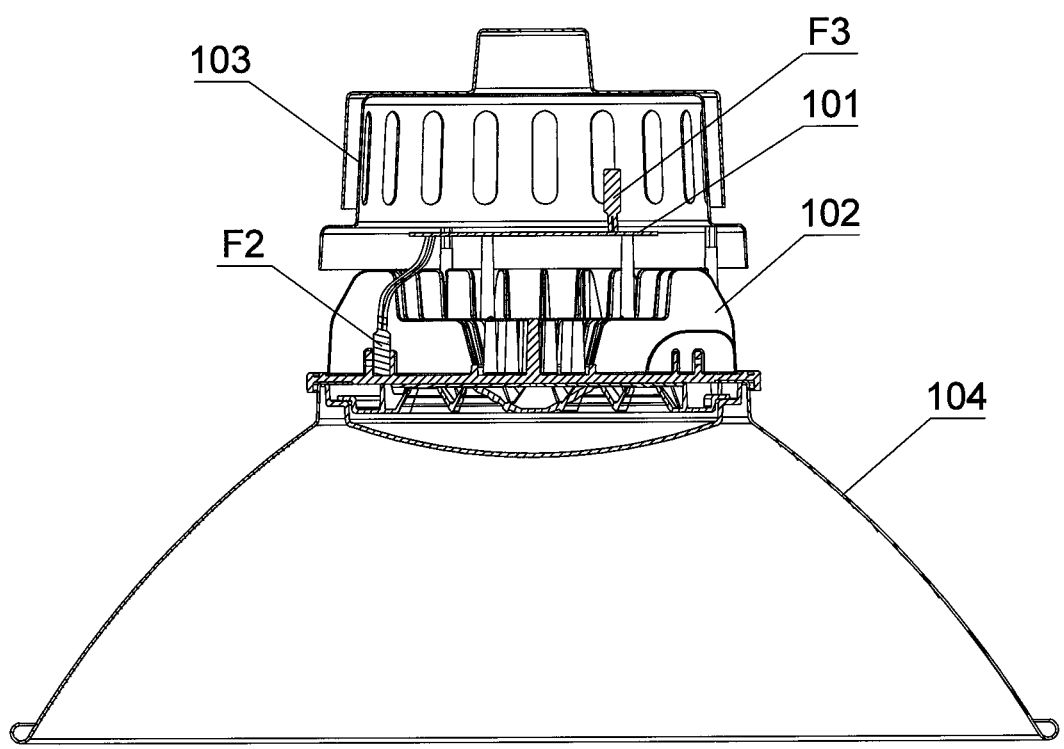
FIG. 5 is a cross-section diagram of the LED lamp according to Embodiment I or II of the present invention.
Figure 6:
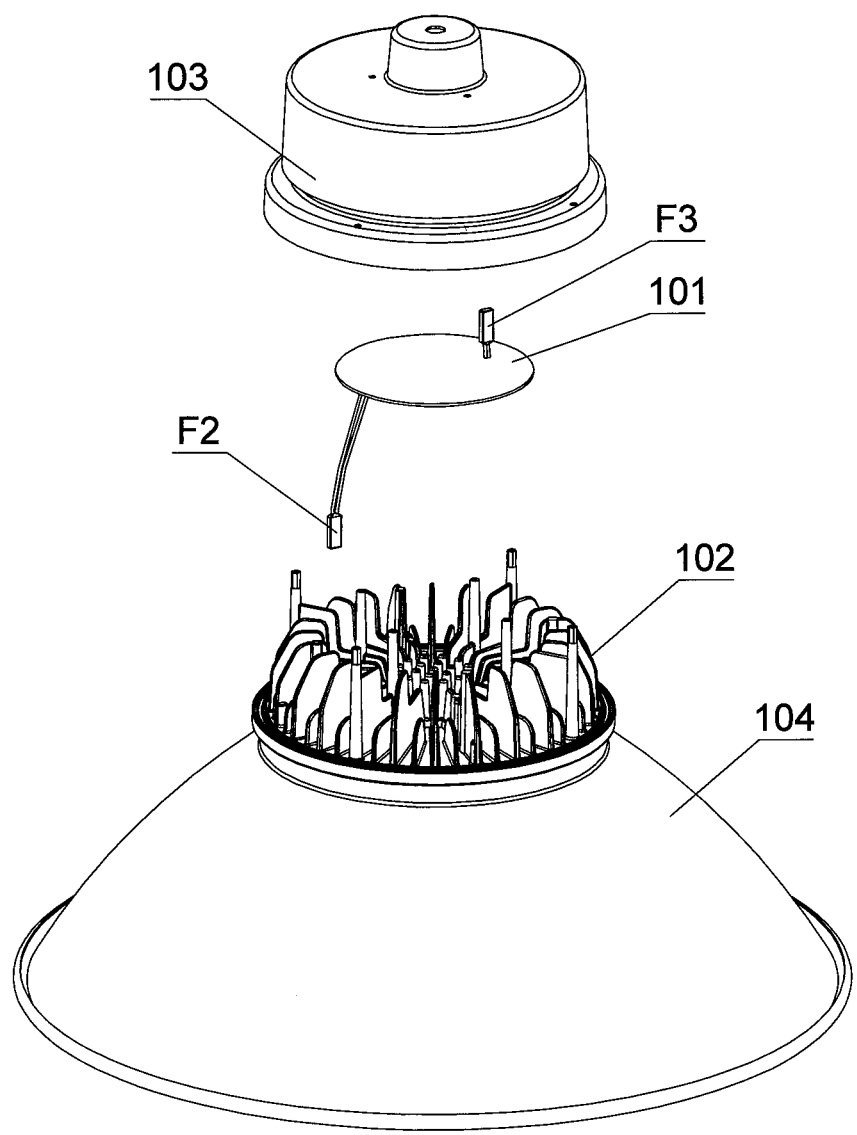
FIG. 6 is a disassembly diagram of the LED lamp according to Embodiment I or II of the present invention.
Figure 7:
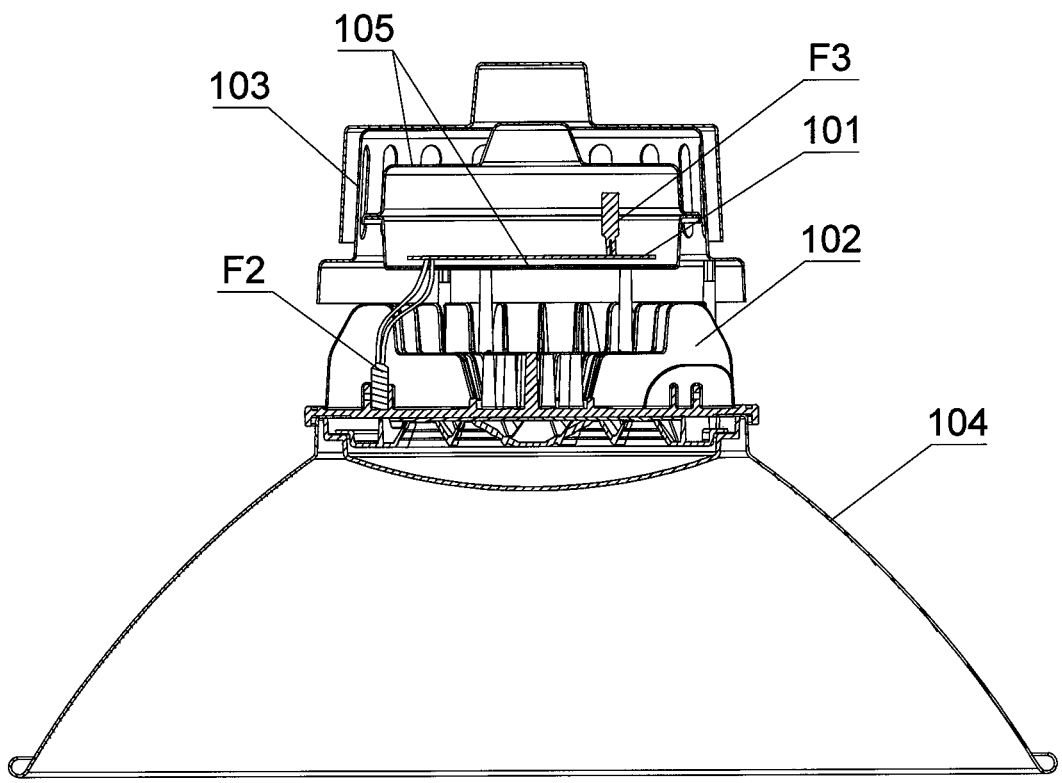
FIG. 7 is a cross-section diagram of the LED lamp according to Embodiment III or IV of the present invention.
Figure 8:
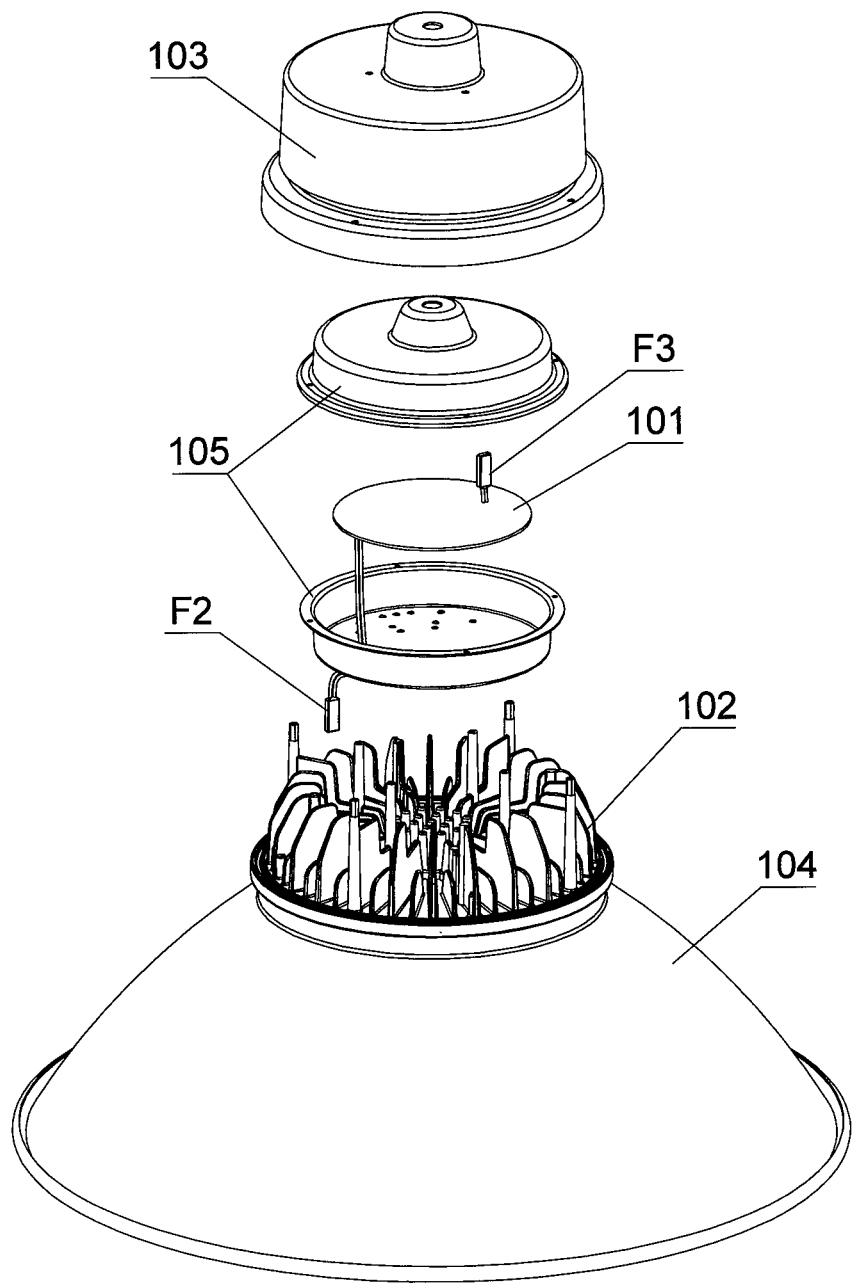
FIG. 8 is a disassembly diagram of the LED lamp according to Embodiment III or IV of the present invention.

As shown in FIG. 1, FIG. 5, FIG. 6, FIG. 9 and FIG. 10, the LED lamp of this embodiment comprises a power board 101 for supplying power to an LED light source as well as a circuit controlling the LED lamp, a heat sink 102 for cooling the LED light source, a waterproof and dustproof lampshade 103 and a reflector 104, wherein the circuit controlling the LED lamp comprises a rectifier circuit 1 for changing an alternating current into a direct current, an LED light source load 3, a constant current circuit 4 that regulates voltage and current for the LED light source load 3, an overcurrent protection circuit 5, a first temperature control switch circuit 6 and a second temperature control switch circuit 7. The rectifier circuit 1 adopts bridge rectification with a rectifier bridge D1, and certainly can adopt other rectification modes for rectification. The overcurrent protection circuit 5 is connected to an input of a power supply with an overcurrent protection fuse F1 that fuses when the circuit is overcurrent to play a role in protection, and the circuit can also be protected by other forms of overrun protection. The first temperature control switch circuit 6 is connected to the input of the power supply and comprises a first normally closed temperature control switch F2, and the first normally closed temperature control switch F2 is mounted on the heat sink 102 and is disconnected when the temperature of the heat sink 102 exceeds the disconnection temperature of the first normally closed temperature control switch F2 to cut off the power supply of the LED light source load 3. The second temperature control switch circuit 7 is connected in series to the LED light source load 3, and comprises a second normally closed temperature control switch F3 and a voltage dividing resistor Rt connected in parallel to the second normally closed temperature control switch F3. The second normally closed temperature control switch F3 is mounted on the power board 101 and is disconnected when the circuit ambient temperature exceeds the disconnection temperature of the second normally closed temperature control switch F3, so that the current passes through the voltage dividing resistor Rt to reduce the power supply current of the LED light source load 3 and avoid turn-off of LEDs. The disconnection temperature of the first normally closed temperature control switch F2 is 70° C. or a specific temperature between 60 and 100° C., and the disconnection temperature of the second normally closed temperature control switch F3 is 50° C. or a specific temperature between 30 and 100° C. The input voltage of the power supply is a specific voltage between alternating current 90 and 300V applicable to mains voltage of every country, with a fluctuation range of ±30V, which ensures that components in the circuit cannot be burnt out when the mains supply fluctuates within the range of ±30V. The alternating current is rectified into a pulsating direct current by the rectifier circuit 1, the pulsating direct current passes through the LED light source load 3, the second temperature control switch circuit 7 and the constant current circuit 4 to form a loop, and the constant current circuit 4 regulates voltage and current for the LED light source load 3. The LED light source load 3 comprises a group of plural LEDs connected in series, namely LED 1~LED (n), the number n of each group of the LEDs connected in series can be determined according to requirements for input voltage, rated power and light source illumination and is generally 30 to 125, and the basic calculation standard of the number n is n=90V/3V~300V/2.4V=30~125. The constant current circuit 4 comprises a group of constant current source devices comprising one depletion mode field effect transistor Q1, of which a drain serves as a contact and a source is short circuited with a grid to serve as the other contact.

In this embodiment, the circuit controlling the LED lamp does not comprise a filter capacitor, which greatly reduces the reactive power of the circuit. The power factor of the circuit of the present invention is tested to be more than 0.85, even up to 0.90, so the circuit is an LED driving circuit with a high power factor. When the pulsating direct current fluctuates within a certain range, the constant current source devices can prevent the fluctuation of the current and make it remain constant, so that the current passing through the LED light source load 3 is quite constant. The constant current source devices are applied with a fluctuating voltage for a function of voltage and current regulation to prolong the service life of the LED light source load 3 by avoiding burn-out.

Figure 9:
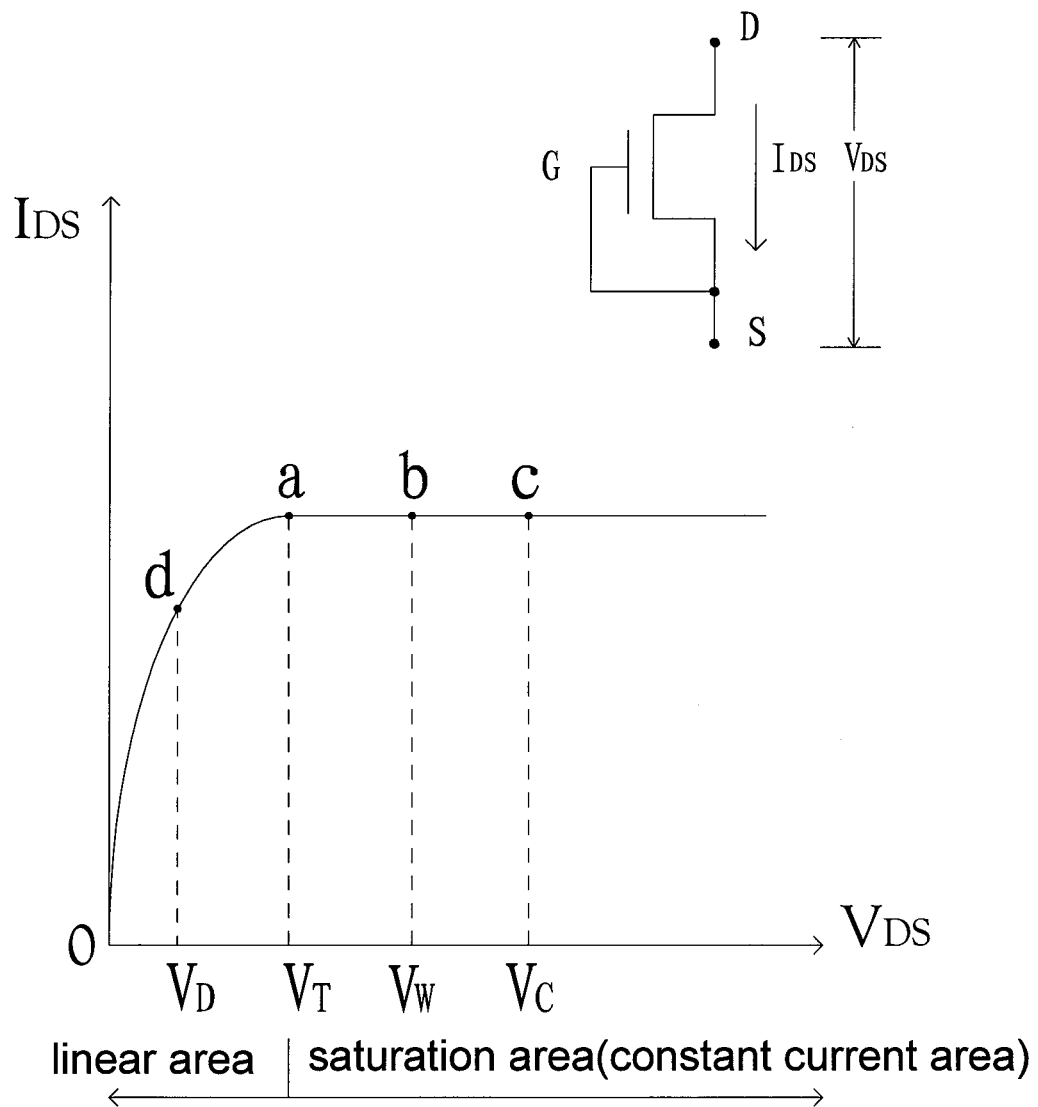
FIG. 9 shows the characteristic of the constant current source device according to the present invention and a current-voltage (I-V) curve diagram thereof during power reduction.
Figure 10:
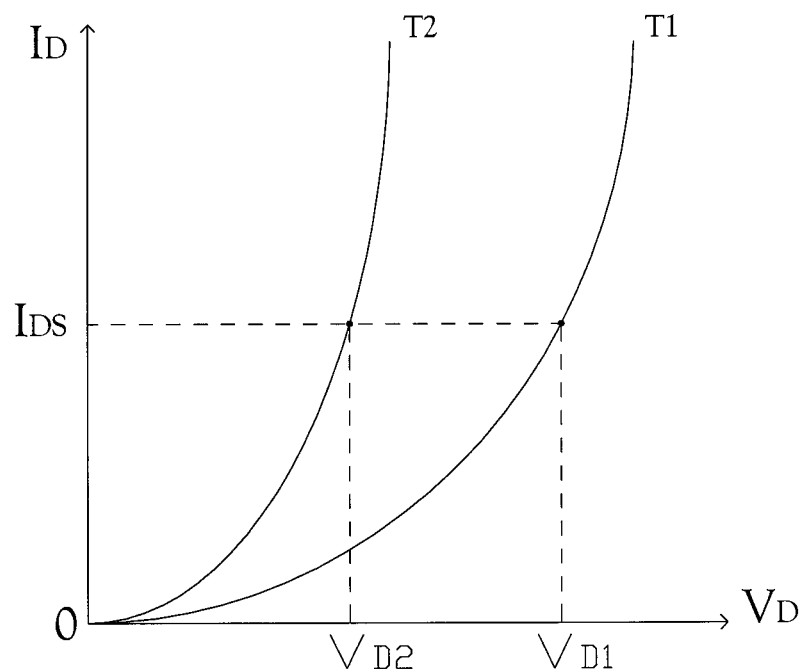
FIG. 10 is a current-voltage (I-V) curve diagram of the LED at different temperatures.

The current-voltage curve diagram of the LEDs at different temperatures is shown in FIG. 10. The LEDs have the characteristic that, with the same current, the voltages at two ends of the LEDs are reduced when the temperature rises. Although the voltage reduction range of each single LED is small, the reduction in total voltage of a LED light source portion with hundreds of LEDs connected in series is substantial. When the ambient temperature rises (for example, to more than 40° C.), the total voltage at the two ends of the light source may be reduced by about 10V even in a constant current environment, and the reduced voltage is added to the two ends of the constant current source devices, resultantly increasing the voltages at the two ends of the constant current source devices. The characteristic of the constant current source device according to the present invention and a current-voltage (I-V) curve diagram thereof during power reduction is shown in FIG. 9. When the voltage $V_{DS}$ between the drain and the source is bigger than a saturation voltage $V_T$ (Point a), the current $I_{DS}$ between the drain and the source of each constant current source device presents the characteristic of a constant current, and the actual working voltage $V_W$ of each constant current source device is generally designed nearby Point b, $V_W \approx V_R + (3~5)V$. When the voltages at the two ends of each constant current source device rise along with the rise of the ambient temperature or the input voltage abruptly rises, the operating point of the constant current source device moves from Point b to Point c, the power consumption of the constant current source device is increased, and the ambient temperature further rises. When the circuit ambient temperature exceeds the disconnection temperature of the second normally closed temperature control switch F3, the second normally closed temperature control switch F3 is disconnected, the current passes through the voltage dividing resistor Rt, the resistance of the voltage dividing resistor Rt is designed in such a way that the shared voltages (such as 17V) at its two ends is bigger than the voltages (such as 10V) increased when the operating point of each constant current source device moves from Point b to Point c, the voltages at the two ends of the constant current source device are further reduced under constant current, by 7V from the initial working voltage for example. The start voltage of the constant current source devices is generally 5V, at this moment the voltages of a constant current source and the reduced voltages of the LED light source are all absorbed by the voltage dividing resistor Rt, and the voltages at the two ends of the constant current source devices are further reduced. If $V_W = V_T + 5V$, the voltages at the two ends of the constant current source devices are reduced to be 2V less than the saturation voltage of a constant current area, the operating point of each constant current source device moves from Point c to an unsaturated linear area of Point d in this process, and at this moment, the working current of the constant current source devices is reduced, and accordingly the power of the constant current source devices and the LEDs is reduced, namely the constant current source devices and the LEDs are in a power reduction operating state, heat is reduced, and the working temperature is reduced. When the working temperature is reduced below the disconnection temperature of the second normally closed temperature control switch F3, the second normally closed temperature control switch F3 is reclosed to work, and the whole circuit recovers to the normal working state.

Embodiment II

As shown in FIG. 2, FIG. 5, FIG. 6, FIG. 9 and FIG. 10, the difference between this embodiment and Embodiment I lies in: in this embodiment, the circuit controlling the LED lamp further comprises a filter circuit 2 connected behind the rectifier circuit 1 and comprising a filter capacitor C1 and a bleeder resistor R1, and can also adopt other filter circuits to supply a more stable current to the LED light source load 3. However, the power factor is affected to a certain extent due to addition of the filter capacitor.

The remaining features of this embodiment are the same as those of Embodiment I.

Embodiment III

As shown in FIG. 3 and FIG. 7 to FIG. 10, the LED lamp of this embodiment comprises a power board 101 for supplying power to an LED light source as well as a circuit controlling the LED lamp, a heat sink 102 for cooling the LED light source, a waterproof and dustproof lampshade 103, a reflector 104, and a sealed power box 105 for proofing the power board 101 against water and dust, wherein the circuit controlling the LED lamp comprises a rectifier circuit 1 for changing an alternating current into a direct current, an LED light source load 3, a constant current circuit 4 that regulates voltage and current for the LED light source load 3, an overcurrent protection circuit 5, a first temperature control switch circuit 6, a second temperature control switch circuit 7, a power lightning protection circuit 8, a power supply EMC circuit 9, a voltage regulation and PFC circuit 10, and a light source EMC circuit 11; the rectifier circuit 1 adopts bridge rectification with a rectifier bridge D1, and certainly can adopt other rectification modes for rectification; the overcurrent protection circuit 5 is connected to an input of a power supply with an overcurrent protection fuse F1 that fuses when the circuit is overcurrent to play a role in protection, and the circuit can also be protected by other forms of overrun protection; the first temperature control switch circuit 6 is connected to the input of the power supply and comprises a first normally closed temperature control switch F2, and the first normally closed temperature control switch F2 is mounted on the heat sink 102 and is disconnected when the temperature of the heat sink 102 exceeds the disconnection temperature of the first normally closed temperature control switch F2 to cut off the power supply of the LED light source load 3; the power lightning protection circuit 8 is connected behind the overcurrent protection circuit 5 and the first temperature control switch circuit 6 for lightning protection, and comprises a capacitor C2, varistors RV1, RV2 and R2, and a discharge tube DSA1; the power supply EMC circuit 9 is connected before the rectifier circuit 1, and the light source EMC circuit 11 is connected behind the voltage regulation and PFC circuit 10 but before the LED light source load 3 so that the circuit meets the requirement of electromagnetic compatibility; the power supply EMC circuit 9 comprises a resistor R3, capacitors C3 to C5, a common mode inductor T1 and a negative temperature coefficient thermistor NTC, and the light source EMC circuit 11 comprises common mode inductors L1 and L2 and a transformer T3. The voltage regulation and PFC circuit 10 is a power factor correcting circuit and is connected behind the rectifier circuit 1 but before the LED light source load 3 for supplying a direct current with stable voltage to the LED light source load 3 and improving the power factor of the whole circuit; the voltage regulation and PFC circuit 10 is a switching power supply and comprises a power factor correcting chip U1 with a power supply PFC power factor control circuit of model MC33262. The power factor correcting chip U1 has advantages of simple circuit, high efficiency and the like, and its peripheral components comprise capacitors C6 to C12, resistors R4 to R9 and R12, diodes D5 and D6, an MOS transistor Q1, and a transformer T2. The second temperature control switch circuit 7 comprises a second normally closed temperature control switch F3, a voltage dividing resistor R10 connected in parallel to the second normally closed temperature control switch F3, and a sampling resistor R11; the second normally closed temperature control switch F3 is mounted on the power board 101 in the power box 105, and the second temperature control switch circuit 7 is connected with the sampling voltage end A of the voltage output B of the voltage regulation and PFC circuit 10; when the circuit ambient temperature exceeds the disconnection temperature of the second normally closed temperature control switch F3, the second normally closed temperature control switch F3 is disconnected, the current passes through the voltage dividing resistor R10, the voltage of the sampling voltage end A rises, and in order to reduce the voltage of the sampling voltage end A to a balanced voltage, the voltage of the voltage output B is reduced through the regulation of the power factor correcting chip U1, so that the direct current voltage of the voltage input C of the LED light source load 3 is equal to the direct current output voltage of the power output B of the voltage regulation and PFC circuit 10; thereby the input voltage of the voltage input C of the LED light source load 3 is reduced, namely the power supply voltage and current of the LED light source load 3 are simultaneously reduced, and the power of the LED lamp is reduced; the disconnection temperature of the first normally closed temperature control switch F2 is 70° C. and can be a specific temperature between 60 and 100° C., and the disconnection temperature of the second normally closed temperature control switch F3 is 80° C. and can be a specific temperature between 30 and 100° C.; the LED light source load 3 comprises a plurality of groups of LEDs connected in series, namely LED 1a~LED(n)a, ..., LED 1x~LED(n)x, each group of the LEDs comprises a plurality of LEDs connected in series, and the number n of each group of the LEDs connected in series can be determined according to the requirements for input voltage, rated power and light source illumination; the constant current circuit 4 comprises a plurality of groups of constant current source devices, each group of the constant current source devices comprises a depletion mode field effect transistor Qa, ... Qx, of which the drain serves as a contact and the source is short circuited with the grid to serve as the other contact, and each group of the constant current source devices is connected in series to a group of LEDs in the LED light source load 3 so that each group of the LEDs can obtain stable working current and is prevented from being burnt out by overcurrent for a long service life; certainly, each group of the constant current source devices can also comprise a plurality of depletion mode field effect transistors and be connected in series to a plurality of groups of LEDs connected in parallel, each group of the constant current source devices comprises a depletion mode field effect transistor Qa, ... Qx, of which the drain serves as a contact and the source is short circuited with the grid to serve as the other contact, and each group of the constant current source devices is connected in series to a group of LEDs in the LED light source load 3, so that each group of the LEDs can obtain stable working current and is prevented from being burnt out by overcurrent for a long service life; each group of the constant current source devices, namely the depletion mode field effect transistors Qa, ... Qx, is connected in parallel to first Zener diodes Da, ..., Dx, and the operating points of the first Zener diodes Da, ..., Dx can be certain specific voltages between 20 and 80V DC selected according to the power of the lamp, the actual condition of the circuit and other factors in such a way that the voltages of the constant current source devices are controlled within a certain range to avoid overly high instantaneous voltages caused by switching surge shock produced when a plurality of lamps are simultaneously turned on, reduce shock to a constant current source, prevent the constant current source devices from being damaged, and ensure stable operation of the whole circuit. Therefore, the constant current source devices have an overvoltage protection function.

The current-voltage curve diagram of the LEDs at different temperatures is shown in FIG. 10. The LEDs have the characteristic that, with the same current, the voltages at two ends of the LEDs are reduced when the temperature rises. Although the voltage reduction range of each single LED is small, the reduction in total voltage of a LED light source portion with hundreds of LEDs connected in series is substantial. When the ambient temperature rises, the total voltage at the two ends of the light source may be greatly reduced even in a constant current environment, and the reduced voltage is added to the two ends of the constant current source devices, resultantly increasing the voltages at the two ends of the constant current source devices. The characteristic of the constant current source device according to the present invention and a current-voltage (I-V) curve diagram thereof during power reduction are shown in FIG. 9. When the voltage $V_{DS}$ between the drain and the source is bigger than a saturation voltage $V_T$ (Point a), the current $I_{DS}$ between the drain and the source of each constant current source device presents the characteristic of a constant current, and the actual working voltage $V_W$ of each constant current source device is generally designed nearby Point b, $V_W \approx V_T + (3\sim5)V$. Therefore, when the voltages at the two ends of each constant current source device rise along with the rise of the ambient temperature or the input voltage abruptly rises, the operating point of the constant current source device moves from Point b to Point c, and the constant current source devices of this invention can avoid abrupt change of the LED current and make it remain constant. $I_{Ds}$ is gradually reduced along with the reduction of $V_{DS}$ when the $V_{DS}$ is smaller than the saturation voltage $V_T$ (Point a), the current passes through the voltage dividing resistor R10 when the second normally closed temperature control switch F3 is disconnected, the output voltage of the voltage output B and the input voltage of the voltage input C of the LED light source load 3 are reduced through the regulation of the power factor correcting chip U1 to reduce the divided voltage of the constant current source devices, $I_{Ds}$ is reduced thereupon when the $V_{DS}$ is smaller than the saturation voltage $V_T$, the power supply current of the LED light source load 3 is also reduced, and the operating point of each constant current source device is at Point d, so the power of the constant current source devices is reduced.

Embodiment IV

As shown in FIG. 4 and FIG. 7 to FIG. 10, the difference between this embodiment and embodiment III lies in: in this embodiment the circuit controlling the LED lamp further comprises a cooling fan motor 12 (cooling fans are not shown in FIG. 7 and FIG. 8) and a fan protection circuit 13 connected in parallel to the cooling fan motor 12, the fan protection circuit 13 comprises three fan shunt resistors R13 connected in parallel to each other and a second Zener diode Dfan connected in parallel to the fan shunt resistors R13, the plurality of fan shunt resistors R13 connected in parallel to each other are used for shunting of a high-power circuit to avoid high temperature brought by a single resistor, and the operating point of the second Zener diode Dfan is a specific voltage between 5 and 24V DC. Thanks to the second Zener diode Dfan, the voltage of the cooling fan motor 12 is controlled within a certain range, overly high instantaneous voltage caused by switching surge shock produced when a plurality of lamps are simultaneously turned on is avoided, shock to the cooling fan motor 12 is avoided, the fan is prevented from being damaged, and stable heat dissipation of the whole circuit is ensured, so the circuit controlling the LED lamp has a fan overvoltage protection function.

The remaining features of this embodiment are the same as embodiment III.

Embodiment V

Figure 11:
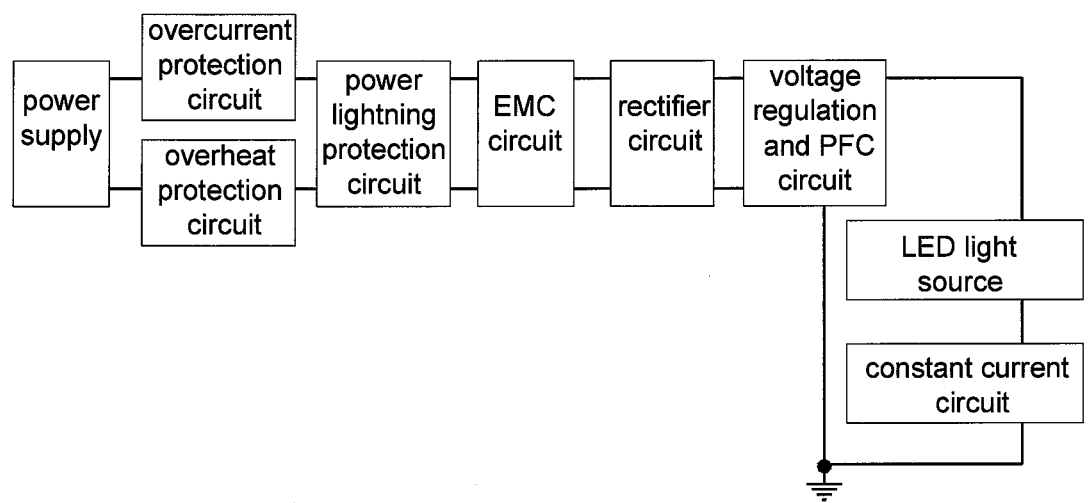
FIG. 11 is a block diagram of the circuit according to Embodiment V of the present invention.
Figure 12:
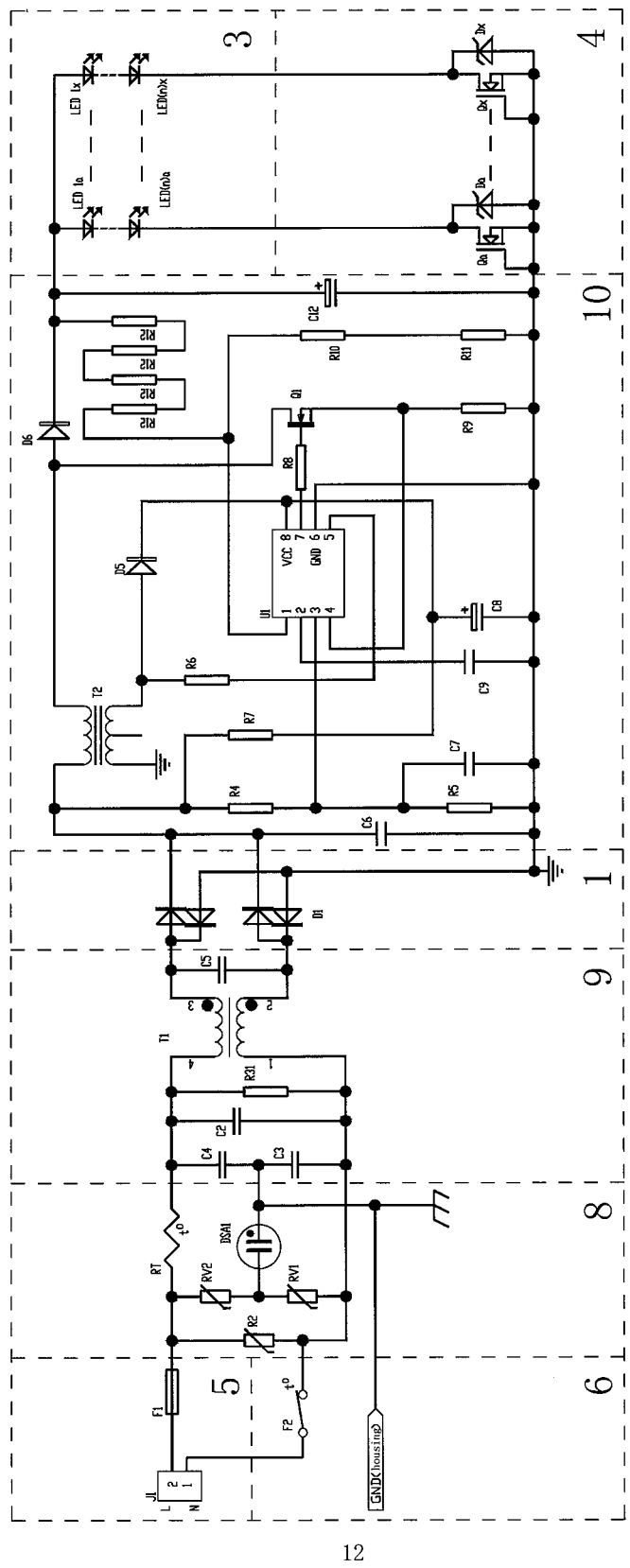
FIG. 12 is a structure diagram of the LED lamp control circuit according to Embodiment V of the present invention.

As shown in FIG. 11 and FIG. 12, an LED lamp of this embodiment comprises a heat sink for passive heat dissipation, and a circuit controlling the LED lamp comprises a rectifier circuit 1 for changing an alternating current into a direct current, an LED light source load 3, a constant current circuit 4 that regulates voltage and current for the LED light source load 3, an overcurrent protection circuit 5, a first temperature control switch circuit 6, a power lightning protection circuit 8, a power supply EMC circuit 9 and a voltage regulation and PFC circuit 10; the rectifier circuit 1 adopts bridge rectification with a rectifier bridge D1 and certainly can adopt other rectification modes for rectification; the overcurrent protection circuit 5 is connected to an input of a power supply and comprises an overcurrent protection fuse F1 which fuses when the circuit is overcurrent to play a role in overcurrent and short circuit protection, and the circuit can also be protected in other forms of overcurrent protection; the first temperature control switch circuit 6 is connected to the input of the power supply, and comprises a first normally closed temperature control switch F2; the first normally closed temperature control switch F2 is mounted on the heat sink, and is disconnected when the temperature of the heat sink exceeds the disconnection temperature of the first normally closed temperature control switch F2 to cut off the power supply of the LED light source load 3; and the disconnection temperature of the first normally closed temperature control switch F2 is 70° C. and can be a specific temperature between 60 and 100° C. By means of providing the first temperature control switch circuit connected to the input of the power supply, the normally closed temperature control switch F2 is disconnected when the temperature of the heat sink exceeds the disconnection temperature of it to cut off the power supply to the LED light source load 3 and is reclosed when the temperature of the heat sink is lower than the disconnection temperature of it to lighten LEDs for lighting, so that short service lives and rejection of the LEDs due to overheat are avoided, the service lives of the LEDs are prolonged, and the LEDs are protected from being damaged by high temperature, so the invention has a high-temperature protection function. The power lightning protection circuit 8 is connected behind the overcurrent protection circuit 5 and the first temperature control switch circuit 6 for lightning protection and comprises varistors RV1, RV2 and R2, a thermistor RT and a discharge tube DSA1, the power supply EMC circuit 9 is connected before the rectifier circuit to enable the circuit to meet the requirement of electromagnetic compatibility, and the power supply EMC circuit 9 comprises a resistor R31, capacitors C2 to C5 and a common mode inductor T1. The voltage regulation and PFC circuit 10 is a power factor correcting circuit and is connected behind the rectifier circuit 1 but before the LED light source load 3 for supplying a direct current with stable voltage to the LED light source load 3 and improving the power factor of the whole circuit, the voltage regulation and PFC circuit 10 is a switching power supply and comprises a power factor correcting chip U1, and the power factor correcting chip U1 adopts a power supply PFC power factor control circuit of model MC33262 produced by the ST Company. The power factor correcting chip U1 has advantages of simple circuit, high efficiency and the like, and peripheral components of which comprise capacitors C6 to C9 and C12, resistors R4 to R12, diodes D5 and D6, an MOS transistor Q1 and a transformer T2. The LED light source load 3 comprises a plurality of groups of LEDs connected in series, namely LED 1a~LED(n)a, . . . , LED 1x~LED(n)x, each group of the LEDs comprises a plurality of LEDs connected in series, and the number n of each group of the LEDs connected in series can be determined according to the requirements for input voltage, rated power and light source illumination. The constant current circuit 4 comprises a plurality of groups of constant current source devices, each group of the constant current source devices comprises depletion mode field effect transistors Qa, . . . Qx of which the drain serves as a contact and the source is short circuited with the grid to serve as the other contact, and each group of the constant current source devices is connected in series to a group of LEDs in the LED light source load 3, so that each group of the LEDs can obtain stable working current, is prevented from being burnt out by overcurrent, and has a long service life. Of course, each group of the constant current source devices can also comprise a plurality of depletion mode field effect transistors and be connected in series to a plurality of groups of LEDs connected in parallel, each group of the constant current source devices comprises depletion mode field effect transistors Qa, . . . Qx of which the drain serves as a contact and the source is short circuited with the grid to serve as the other contact, and each group of the constant current source devices is connected in series to a group of LEDs in the LED light source load 3, so that each group of the LEDs can obtain stable working current, is prevented from being burnt out by overcurrent, and has a long service life. Each group of the constant current source devices, namely the depletion mode field effect transistors Qa, . . . Qx, is connected in parallel to first Zener diodes Da, . . . , Dx, and the operating points of the first Zener diodes Da, . . . , Dx can be certain specific voltages between 20 and 80V DC according to power of the lamp, the actual condition of the circuit and other factors selected in such a way that the voltages of the constant current source devices are controlled within a certain range, overly high instantaneous voltage caused by switching surge shock produced when a plurality of lamps are simultaneously turned on is avoided, shock to a constant current source is reduced, the constant current source devices are prevented from being damaged, and stable operation of the whole circuit is ensured. Therefore, the invention has an overvoltage protection function for key components, namely the constant current source devices.

Embodiment VI

Figure 13:
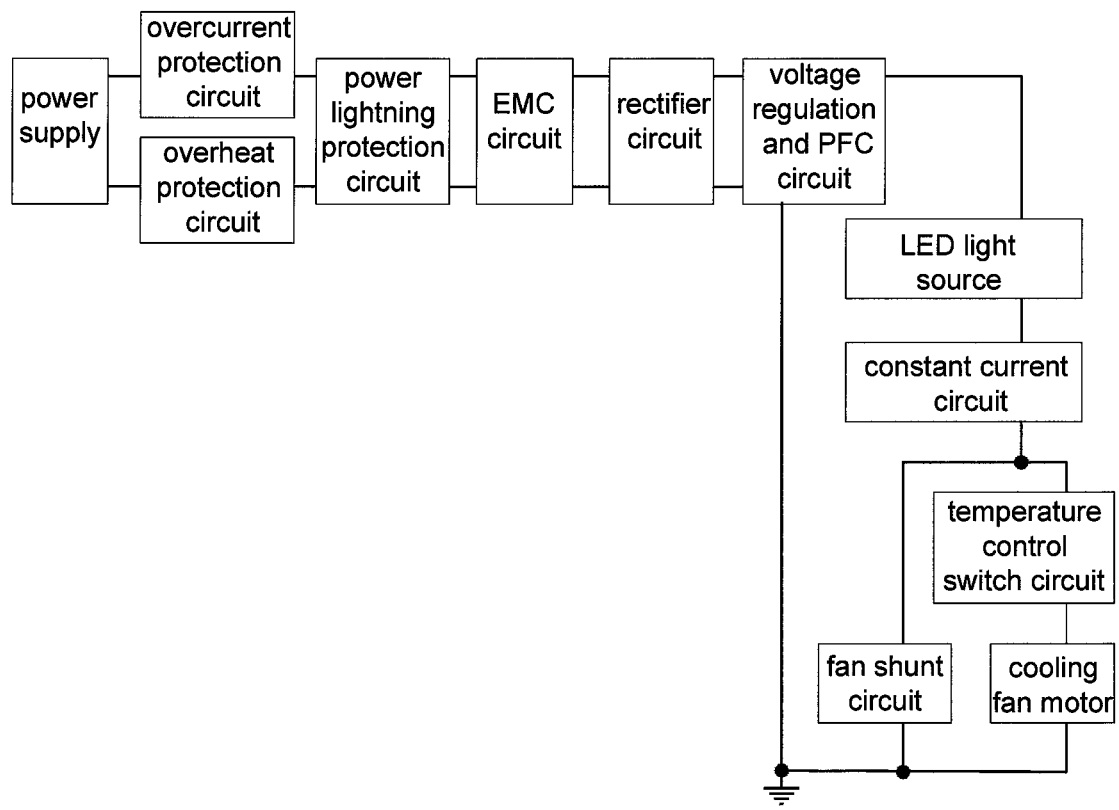
FIG. 13 is a block diagram of the circuit according to Embodiment VI of the present invention.
Figure 14:
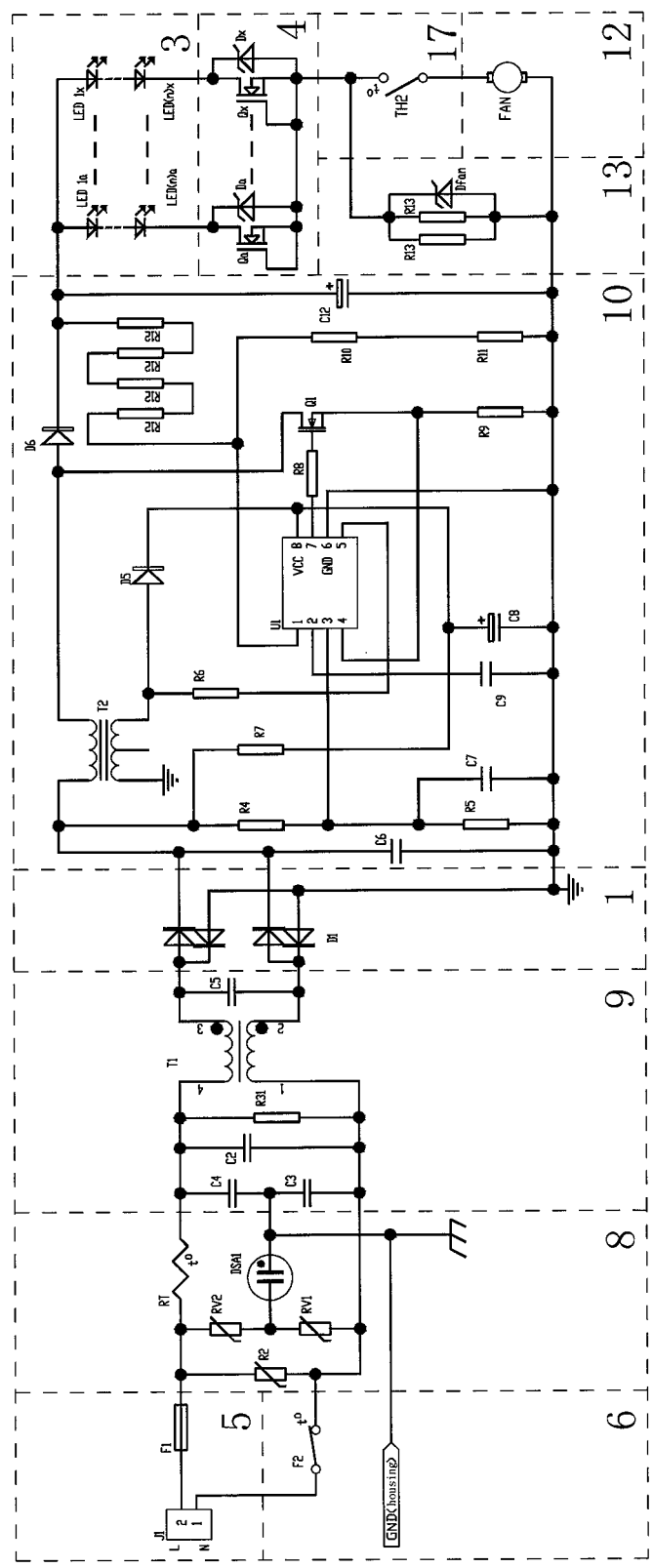
FIG. 14 is a structure diagram of the LED lamp control circuit according to Embodiment VI of the present invention.

As shown in FIG. 13 and FIG. 14, the LED lamp of this embodiment can be applied to high bay lights for cold storages and comprises a cooling fan for active heat dissipation and a heat sink for passive heat dissipation, and the difference between this embodiment and embodiment V lies in: the circuit controlling the LED lamp of this embodiment further comprises a cooling fan motor 12, a fan protection circuit 13, and a third temperature control switch circuit 17 connected in series to the lamp fan motor 12 and then connected in parallel to the fan protection circuit 13, wherein the fan protection circuit 13 comprises two fan shunt resistors R13 and a second Zener diode Dfan connected in parallel to the fan shunt resistors R13, the fan shunt resistors R13 are used for shunting of a high-power circuit to avoid high temperature brought by a single resistor, the operating point of the second Zener diode Dfan is a specific voltage between 6 and 24V DC selected according to power of the lamp, actual condition of the circuit and other factors, and the third temperature control switch circuit 17 comprises a normally open temperature control switch TH2. When the temperature exceeds the close temperature of the normally open temperature control switch TH2, the normally open temperature control switch TH2 is closed to supply power to the lamp fan motor 12, so that the fan runs for active heat dissipation. When the temperature is lower than the close temperature of the normally open temperature control switch TH2, the normally open temperature control switch TH2 is disconnected, so that the lamp fan motor 12 does not run to avoid waste and noise and avoid the disadvantages caused by forcibly starting the icing fan in special low-temperature occasions. The close temperature of the normally open temperature control switch TH2 is 30° C. and can be a specific temperature between 30 and 50° C. selected according to the temperature condition of the service environment of the lamp and other factors. Thanks to the second Zener diode Dfan, the voltage of the lamp fan motor 12 is controlled within a certain range, overly high instantaneous voltage caused by switching surge shock produced when a plurality of lamps are simultaneously turned on is avoided, shock to the lamp fan motor 12 is reduced, the fan is prevented from being damaged, and stable heat dissipation of the whole circuit is ensured. The circuit controlling the LED lamp of this embodiment has multiple protection functions of high-temperature protection, low-temperature protection and overvoltage protection.

The remaining features of this embodiment are the same as those of embodiment V.

The above embodiments merely illustrate the present invention without limiting the claims of the present invention. For example, the heat sink where the first normally closed temperature control switch F2 is mounted according to the above embodiments is not the unique position for mounting the first normally closed temperature control switch F2, which can be mounted at other certain specific position in the lamp according to the power condition of the lamp and the heating condition of the circuit, such as on a triode producing high heat. The first normally closed temperature control switch F2 is disconnected when the temperature at the specific position in the lamp exceeds the disconnection temperature of the first normally closed temperature control switch F2 to cut off the power supply of the LED light source load 3 so as to achieve a protection effect.

In the present invention, the constant current source devices, as independent devices, conveniently replace peripheral voltage regulation and current regulation circuits of other circuits in the prior art, so that circuit components are greatly reduced, and the circuit is simple and low in cost. By means of providing the first Zener diode and the second Zener diode, the voltages of the constant current source devices and the fan are controlled within a certain range, overly high instantaneous voltage caused by switching surge shock produced when a plurality of lamps are simultaneously turned on is avoided, shock to key components in the circuit is reduced, the key components are prevented from being damaged, and stable operation of the whole circuit is ensured. In a word, the present invention is simple in structure, reliable in control and low in cost, and has an overvoltage protection function for the key components.

By utilizing characteristics such as a constant current source regulating the current when the voltage rises and a current decreasing when the voltage is reduced to be lower than the saturation voltage, the current and power of the LEDs can be reduced at a high temperature with the help of temperature control switches, so that a function that an LED lamp is able to work at a quite high temperature without being damaged is ensured, and double requirements of lighting function and self protection are furthest met. The present invention is a breakthrough for LED lighting in extreme industrial mines.

The present invention can be widely applied in the field of LED lighting.

The invention claimed is:
1. An LED lamp and LED lamp control circuit, comprising:
a heat sink that cools an LED light source;
a rectifier circuit that changes an alternating current into a direct current;
an LED light source load;
a constant current circuit that regulates voltage and current for the LED light source load; and
a first temperature control switch circuit, wherein
the LED light source load comprises at least one group of plural LEDs connected in series,
the constant current circuit comprises at least one group of constant current source devices with each group being connected in series to at least one group of the LEDs in the LED light source load and comprises at least one depletion mode field effect transistor of which a drain serves as a contact and a source is short circuited with a grid to serve as the other contact, the first temperature control switch circuit is connected to an input of a power supply and comprises a first normally closed temperature control switch, and the first normally closed temperature control switch is mounted on the heat sink or at a specific position in the lamp and is disconnected when the temperature of the heat sink or the temperature at the specific position in the lamp exceeds the disconnection temperature of the first normally closed temperature control switch, which is a specific temperature between 60 and 100° C., to cut off the power supply to the LED light source load.

2. The LED lamp and LED lamp control circuit according to claim 1, wherein each group of the constant current source devices is connected in parallel to a first Zener diode with an operating point being a specific voltage between 20 and 80V DC.

3. The LED lamp and LED lamp control circuit according to claim 1, further comprising a filter circuit connected after the rectifier circuit.

4. The LED lamp and LED lamp control circuit according to claim 1, further comprising an overcurrent protection circuit that is connected to the input of the power supply and comprises an overcurrent protection fuse, and further comprising a power lightning protection circuit connected after the overcurrent protection circuit and the first temperature control switch circuit.

5. The LED lamp and LED lamp control circuit according to claim 1, further comprising a power supply EMC circuit that is connected before the rectifier circuit and adopts bridge rectification.

6. The LED lamp and LED lamp control circuit according to claim 1, further comprising a light source EMC circuit connected before the LED light source load.

7. The LED lamp and LED lamp control circuit according to claim 1, further comprising a voltage regulation and PFC circuit connected after the rectifier circuit but before the LED light source load.

8. The LED lamp and LED lamp control circuit according to claim 1, further comprising a cooling fan motor and a fan protection circuit connected in parallel to the cooling fan motor, which comprises at least one fan shunt resistor and a second Zener diode connected in parallel to the fan shunt resistor with an operating point being a specific voltage between 5 and 24V DC.

9. The LED lamp and LED lamp control circuit according to claim 1, wherein the LED lamp further comprises a power board for supplying power to the LED light source, and the LED lamp control circuit further comprises a second temperature control switch circuit comprising a second normally closed temperature control switch and a voltage dividing resistor connected in parallel with the second normally closed temperature control switch, the second normally closed temperature control switch (F3) being mounted on the power board and being disconnected when the circuit ambient temperature exceeds the disconnection temperature of the second normally closed temperature control switch, which is a specific temperature between 30 and 100° C., so that the current passes through the voltage dividing resistor to reduce the power supply current of the LED light source load.

10. The LED lamp and LED lamp control circuit according to claim 8, wherein the second temperature control switch circuit is connected in series with the LED light source load.

11. The LED lamp and LED lamp control circuit according to claim 8, wherein the LED lamp control circuit comprises the voltage regulation and PFC circuit connected after the rectifier circuit but before the LED light source load, the second temperature control switch circuit is connected to a sampling voltage end of a voltage output of the voltage regulation and PFC circuit, and the second normally closed temperature control switch is disconnected when the circuit ambient temperature exceeds the disconnection temperature of the second normally closed temperature control switch so that the current passes through the voltage dividing resistor to reduce the output voltage of the voltage output of the voltage regulation and PFC circuit and the input voltage of a voltage input of the LED light source load.

12. The LED lamp and LED lamp control circuit according to claim 1 with a key component overvoltage protection function, further comprising:

a cooling fan motor;

a fan protection circuit; and a third temperature control switch circuit connected in series to the lamp fan motor and then connected in parallel with the fan protection circuit, wherein the fan protection circuit comprises at least one fan shunt resistor and the second Zener diode (Dfan) connected in parallel with the fan shunt resistor with an operating point being a specific voltage between 6 and 24V DC, and the third temperature control switch circuit comprises a normally open temperature control switch that is closed when the temperature exceeds the close temperature of the normally open temperature control switch, which is a specific temperature between 30 and 50° C., to supply power to the lamp fan motor.

* * * * *